United States Patent
Lee et al.

(10) Patent No.: US 7,557,877 B2
(45) Date of Patent: Jul. 7, 2009

(54) DISPLAY APPARATUS

(75) Inventors: Ho-Jung Lee, Gyeonggi-do (KR);
Se-Kang Hur, Gyeonggi-do (KR);
Jin-Tak Kim, Gyeonggi-do (KR);
Ho-Seok Han, Seoul (KR); Jae-Young Lee, Seoul (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 303 days.

(21) Appl. No.: 11/544,879

(22) Filed: Oct. 5, 2006

(65) Prior Publication Data

US 2007/0121035 A1 May 31, 2007

(30) Foreign Application Priority Data

Nov. 25, 2005 (KR) .................. 10-2005-0113656
Dec. 5, 2005 (KR) .................. 10-2005-0117519

(51) Int. Cl.
*G02F 1/1335* (2006.01)

(52) U.S. Cl. ............................................. 349/113

(58) Field of Classification Search ................ None
See application file for complete search history.

(56) References Cited

U.S. PATENT DOCUMENTS

| 6,812,973 | B2 | 11/2004 | Alakontiola | |
|---|---|---|---|---|
| 2002/0021391 | A1 | 2/2002 | Yoshino | |
| 2004/0027315 | A1* | 2/2004 | Senda et al. | 345/30 |
| 2004/0080686 | A1* | 4/2004 | Chuang | 349/113 |
| 2005/0105021 | A1* | 5/2005 | Lee et al. | 349/113 |

FOREIGN PATENT DOCUMENTS

| EP | 1389775 | 7/2004 |
|---|---|---|
| JP | 2002-103444 | 4/2002 |
| JP | 2004-145109 | 5/2004 |
| JP | 2005-10620 | 1/2005 |
| KR | 20-0266573 | 2/2002 |
| WO | 2004104678 | 12/2004 |

OTHER PUBLICATIONS

English Language Abstract, JP Patent First Publication No. 2004-145109, May 20, 2004, 1 page.
Patent Abstracts of Japan, Publication No. 2002-103444, Apr. 9, 2002, 1 page.
Patent Abstracts of Japan, Publication No. 2005-010620, Jan. 13, 2005, 1 page.
Patent Abstracts of Korea, Publication No. 20-0266573, Feb. 19, 2002, 1 page.

* cited by examiner

*Primary Examiner*—Michelle R. Connelly-Cushwa
*Assistant Examiner*—Chris Chu
(74) *Attorney, Agent, or Firm*—Haynes and Boone, LLP

(57) ABSTRACT

The display apparatus includes a first substrate and a second substrate. The first substrate is divided into a first region and a second region, and a reflection layer pattern is formed in the second region of the first substrate. The second substrate faces the first substrate. Pixel regions are defined on the second substrate, and a pixel electrode is formed on each of the pixel regions. A transmission type image is displayed on a first region of the first substrate and, on a second region of the second substrate, a reflection type image is displayed, so that a two-sided image is displayed using only two substrates thereby reducing the overall thickness of the display apparatus.

20 Claims, 13 Drawing Sheets

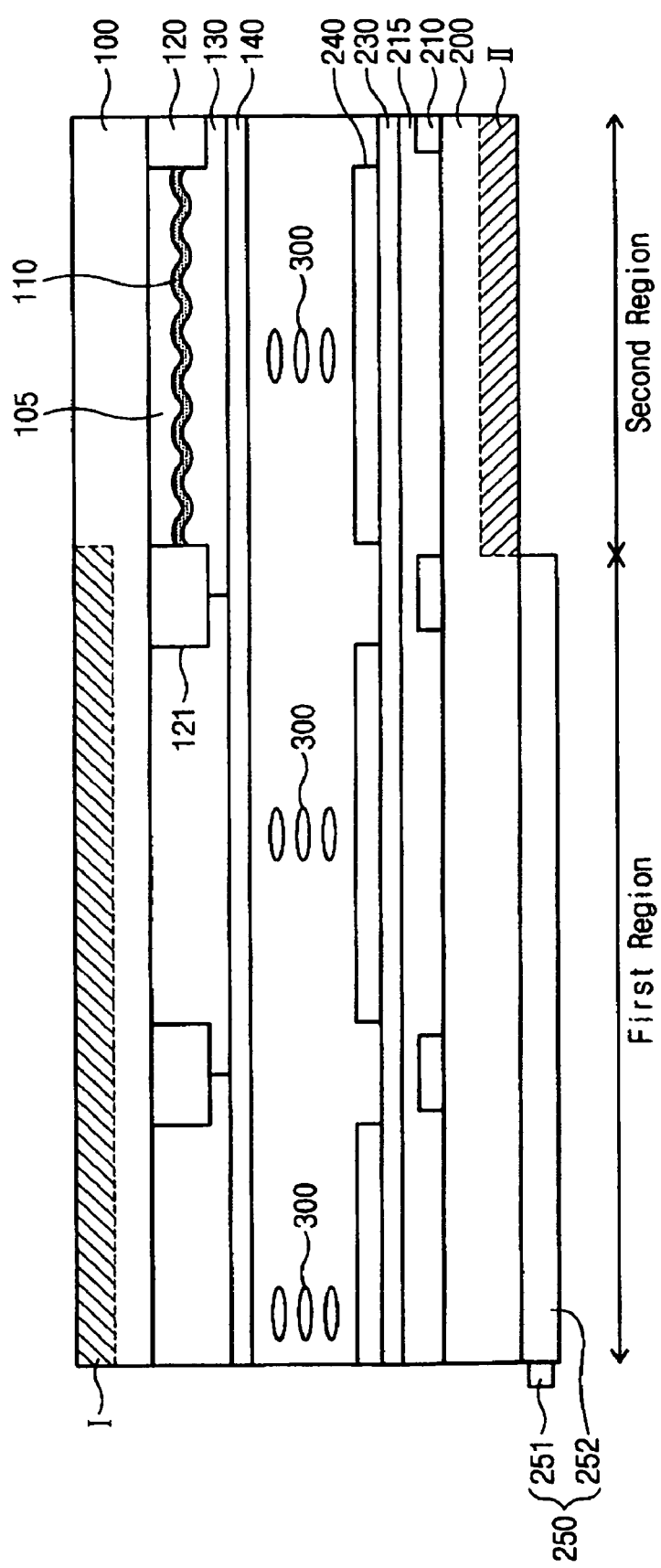

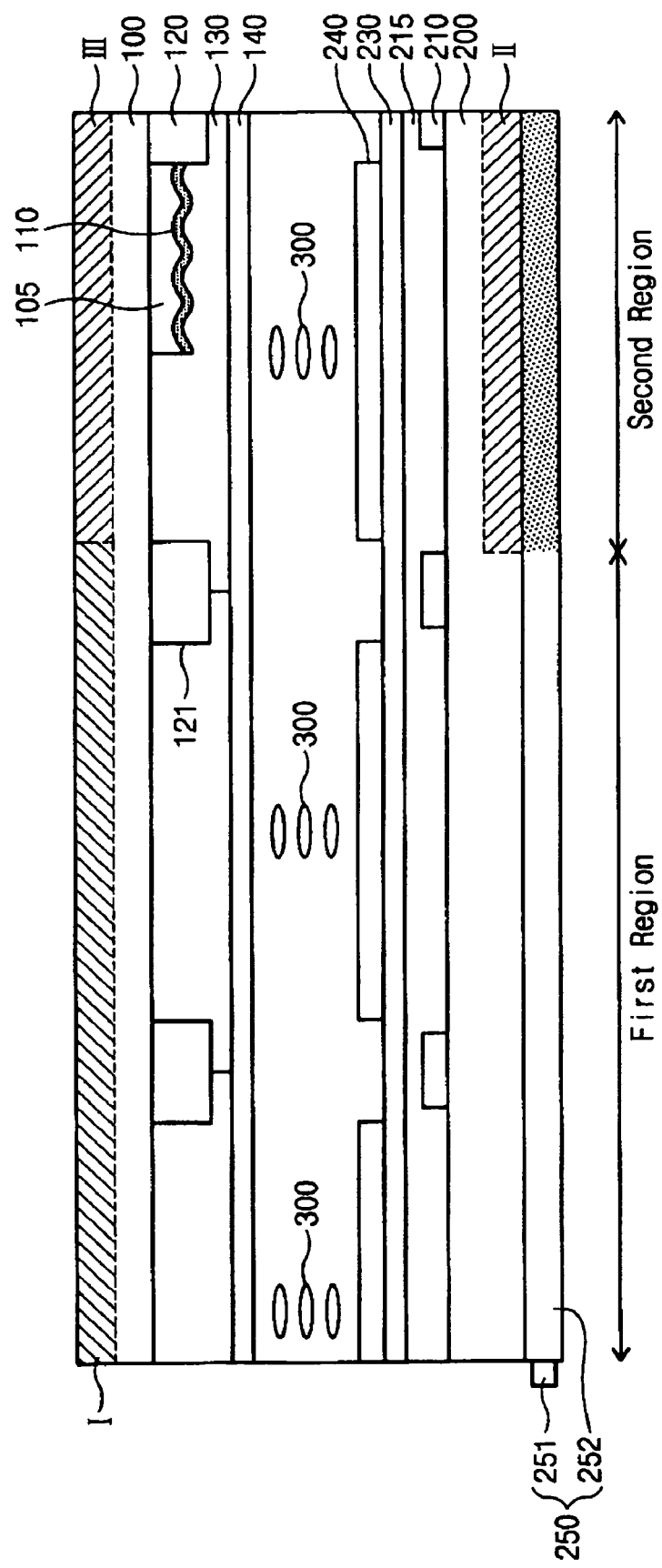

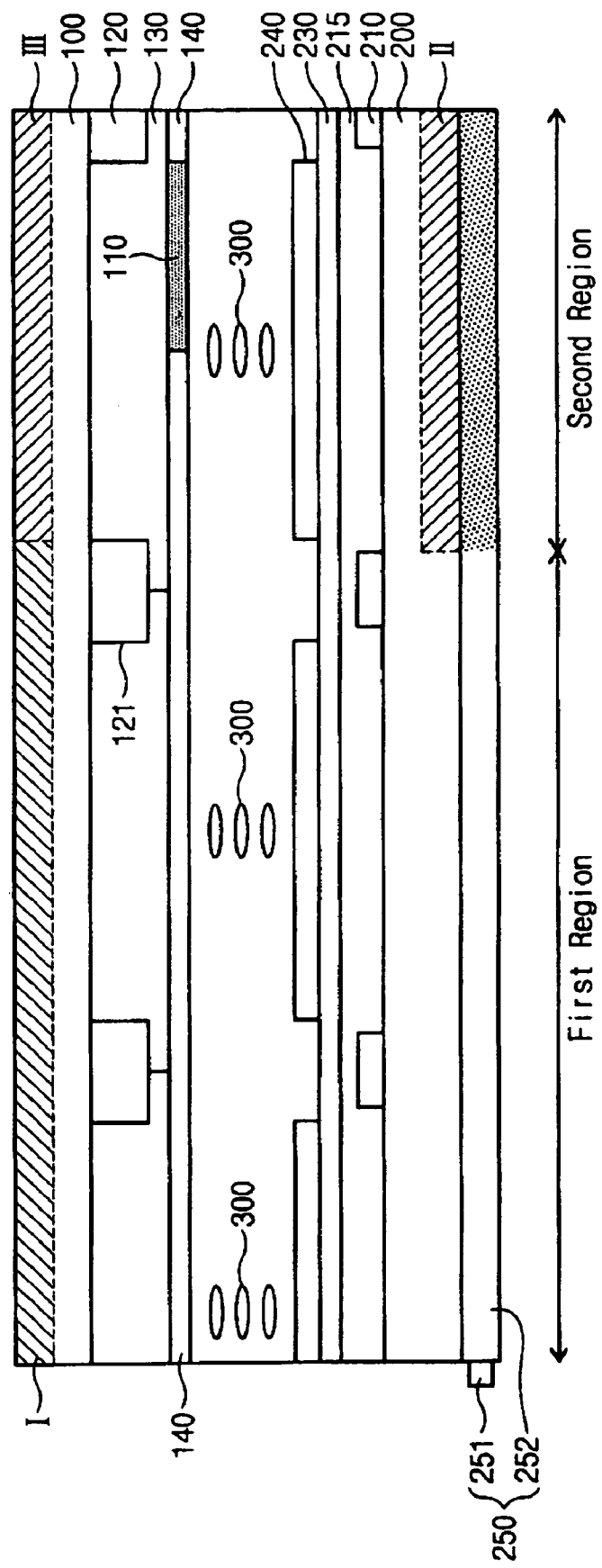

DISPLAY APPARATUS

REFERENCE TO RELATED APPLICATION

This application claims the benefit of priority of Patent Application Numbers 2005-113656 and 2005-117519 filed in the Republic of Korea Intellectual Property Office on Nov. 25, 2005 and Dec. 5, 2005.

FIELD OF THE INVENTION

The present invention relates to a display apparatus.

DESCRIPTION OF THE RELATED ART

Liquid crystal displays (LCDs) are widely used in desk top and notebook computers as well as in mobile communication terminals. The LCD displays an image when an input electrical signal varies the light transmittance of the liquid crystal that is interposed between two substrates. A backlight assembly is mounted on one of the substrates. Light from the backlight assembly passes through the LC, each pixel displaying a portion of the image determined by the alignment of the adjacent liquid crystal molecules.

Assuming that a place on which the image is displayed is a display part, the display part is formed on an outer surface of one substrate of the two substrates that is opposite to and faces the other substrate on which the backlight assembly is mounted. That is, in order to form a single display part, two substrates and a single backlight assembly as a light-emitting source are required. Recently, a demand for a product having a plurality of display parts (e.g., a mobile communication terminal) increases. However, in order to form a plurality of display parts, each display part requires two substrates and one light-emitting source. Accordingly, to form two display parts, four substrates and two light-emitting sources are required. When an LCD with four substrates is used for a terminal, its thickness may exceed 4 mm, which is considered excessive and contrary to the recent trend of consumer demand to reduce terminal's size.

SUMMARY OF THE INVENTION

The present invention provides a thinner display apparatus than has heretofore been achievable. Embodiments of the present invention provide a display apparatus including: a first substrate that is divided into a first region and a second region having a reflection layer pattern. A second substrate includes pixel regions each having a pixel electrode. The reflection layer pattern is located in a region corresponding to each of the pixel regions. A transmission type image is displayed on the first region of the first substrate, and a reflection type image is displayed on a second region of the second substrate, so that a two-sided image can be displayed using only two substrates, thereby reducing the overall size of the display apparatus.

The reflection layer pattern may be limited to an area of the second substrate that corresponds to portion of each of pixel regions. A backlight assembly for illuminating the first region and the second region may be mounted on a portion of the second substrate that is opposite to the pixel electrode.

Different images are displayed in transmission types on the first region and the second region of the first substrate, and reflection type images are displayed on the second region of the second substrate. The same images are displayed on both the second region of the first substrate and the second region of the second substrate.

Embodiments of the present invention provide a display apparatus including: a main body and a folder that is connected thereto, the folder being opened and closed, a first substrate installed in the folder and divided into a first region and a second region, a reflection layer pattern formed in the second region on the first substrate, a second substrate installed in the folder to face the first substrate and where pixel regions are defined and a pixel electrode is formed in each of the pixel regions on the second substrate. The reflection pattern is located in a predetermined region corresponding to each of the pixel regions. An image is displayed in the first region of the first substrate when the folder is opened and displays in the second region of the second substrate when the folder is closed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3B is a cross-sectional view of an LCD according to an embodiment of the present invention;

FIGS. 4B and 4C are cross-sectional views of an LCD according to another embodiment of the present invention;

DETAILED DESCRIPTION OF THE INVENTION

Figure 1:
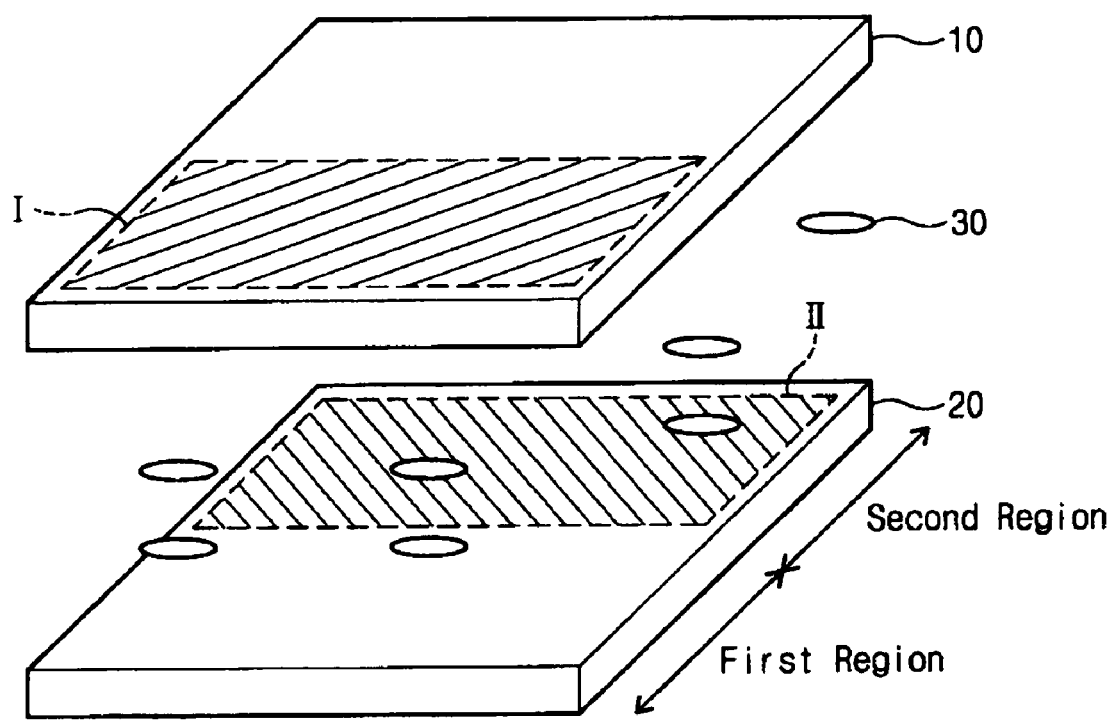
FIG. 1 is a view explaining an operational principle of the present invention.

Reference will now be made in detail to the preferred embodiments of the present invention, examples of which are illustrated in the accompanying drawings. In the drawings, the thicknesses of layers and regions are exaggerated for clarity. Like reference numerals in the drawings denote like elements.

Referring to FIG. 1, an LCD includes first substrate 10 and second substrate 20 coupled to face each other, liquid crystal (LC) 30 being interposed between them. For convenience, the surfaces of substrates 10 and 20 facing LC 30 are each called an "inside", the opposite surfaces each being called an "outside". Also, a display part is a region of an outer surface of the substrates 10 and 20, on which an image is to be displayed.

Each of the first and second substrates 10 and 20 is divided into a first region and a second region. An image is displayed on a first region (hereinafter referred to as a first display part) formed on outer surface of the first substrate 10. An image is also displayed on a second region (referred to as a second display part hereinafter). The hatched part in FIG. 1 is an "X-ray view" of the display part that is actually formed on an outer surface of the second substrate 20. The first display part I and the second display part II do not overlap each other. When the display parts I and II are formed such that each of the display parts I and II is divided into the first region and the second region, two-sided display parts I and II are formed using only the two substrates 10 and 20. That is, the number of substrates used is only half of that of a conventional two-sided LCD, and the size and thickness of the LCD remarkably reduces.

Since the LC 30 is not a light-emitting body, a separate light source is required in order to display an image on the display parts I and II.

LCDs are classified into reflective LCDs using an external natural light, transmissive LCDs using light generated from an inside of the LCDs, and transflective LCDs using both an external natural light and light generated from an inside of the LCDs. The reflective LCDs or transflective LCDs include a reflection layer pattern for reflecting light incident from the outside. Both the transmissive LCDs and the transflective LCDs require a backlight.

Various applications of an LCD may be realized as illustrated in FIGS. 2A through 2D depending on whether the LCD is the reflective LCDs or the transflective LCDs. That is, both the first display part I and the second display part II may be realized in a reflection type or a transmission type. Also, one of the first display part I and the second display part II may be realized in a reflection type, and the other of the first display part I and the second display part II may be realized in a transmission type.

Figure 2A:
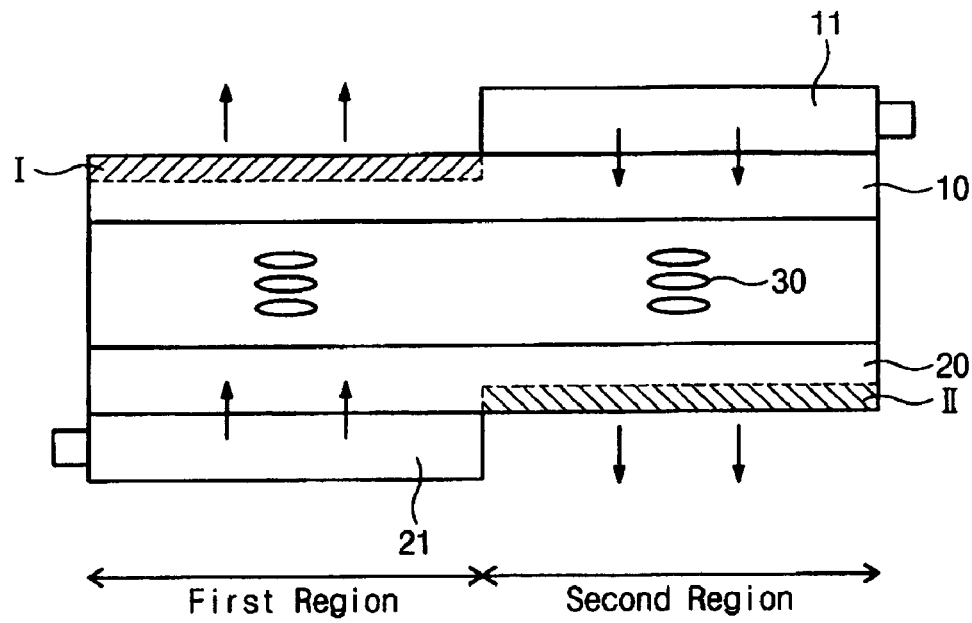
FIGS. 2A through 2D cross-sectional views of various applications according to the principle of FIG. 1.

Referring to FIG. 2A, both a first display part I and a second display part II may be realized in a transmission type. In this case, a first backlight assembly 11 and a second backlight assembly 21 are mounted on outer surfaces of first substrate 10 and second substrate 20, respectively. Light from the first backlight assembly 11 passes through the first substrate 10, LC 30, and second substrate 20 displaying an image on the second display part II of substrate 20. Likewise, an image using light from backlight assembly 21 (mounted on substrate 20), is displayed on the outer surface of first substrate 10 at its first display part I.

Figure 2B:
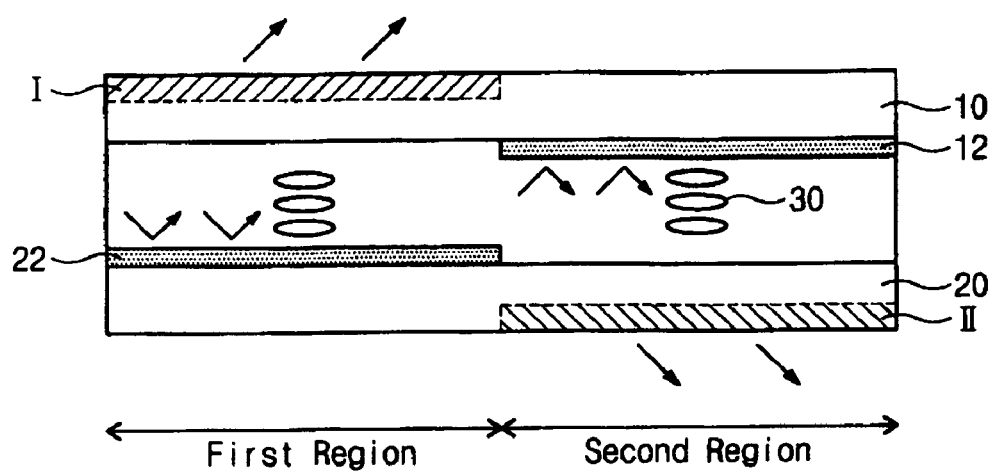

Referring to FIG. 2B, both a first display part I and a second display part II may be realized in a reflection type. In this case, a first reflection layer pattern 12 and a second reflection layer pattern 22 are provided on inner surfaces of first substrate 10 and second substrates 20, respectively. Light incident onto the first substrate 10 from the outside is reflected by the second reflection layer pattern 22 on substrate 20. The reflected light passes through LC 30 to display an image on the first display part I of first substrate 10. Likewise, light incident onto the second substrate 20 from the outside is reflected by first reflection layer pattern 12 on substrate 10, the reflected light passing through LC 30 to display an image on the second display part II of substrate 20.

The first reflection layer pattern 12 and the second reflection layer pattern 22 are formed on a second region and a first region, respectively, so that the first and second reflection layer patterns 12 and 22 do not overlap with each other. If the first reflection layer pattern 12 is formed on the first region, light incident onto the first substrate 10 is reflected by the first reflection layer pattern 12 before reaching the second reflection layer pattern 22, and does not pass through the LC 30.

Figure 2C:
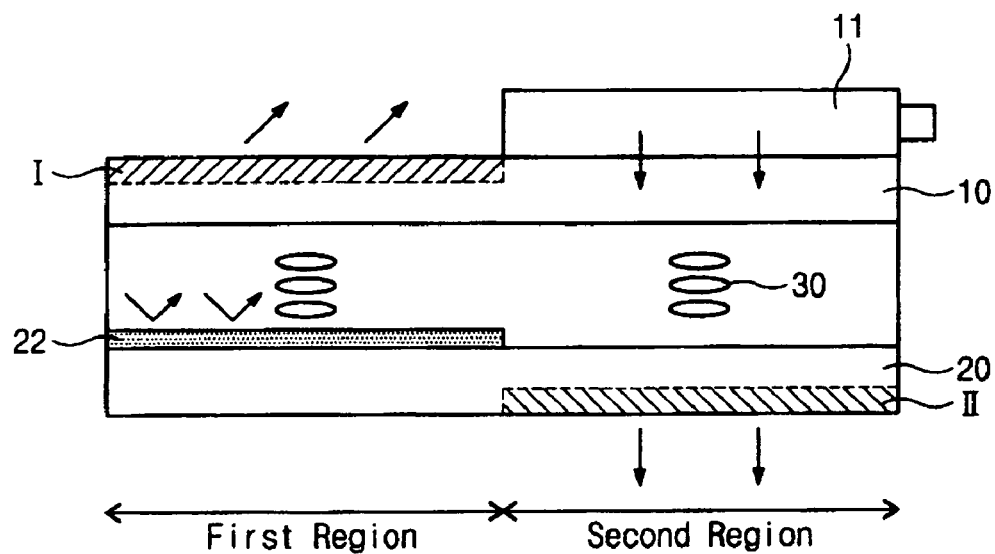

Referring to FIG. 2C, a first display part I may be realized in a reflection type, and a second display part II may be realized in a transmission type. In this case, a second reflection layer pattern 22 is provided on an inner surface of second substrate 20, and a first backlight assembly 11 is mounted on an outer surface of the first substrate 10. Light incident onto the first substrate 10 from the outside is reflected by the second reflection layer pattern 22, and the reflected light passes through LC 30 and the first substrate 10 to display an image on the first display part I. On the other hand, light illuminated from the first backlight assembly 11 passes through the LC 30 to display an image on the second display part II.

Figure 2D:
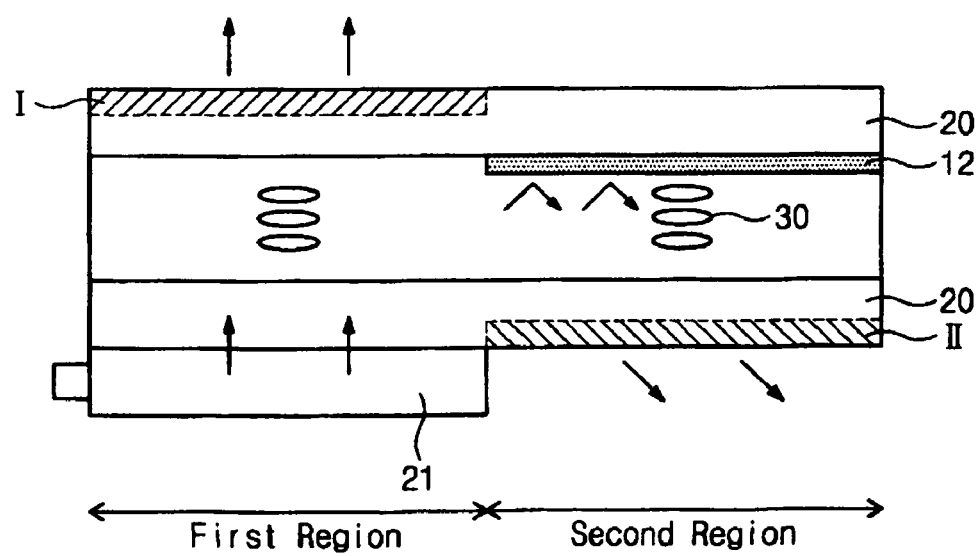

Referring to FIG. 2D, a first display part I may be realized in a transmission type, and a second display part II may be realized in a reflection type. In this case, a second backlight assembly 21 is mounted on an outer surface of second substrate 20, and a first reflection layer pattern 12 is provided on an inner surface of first substrate 10. Operation of the LCD illustrated in FIG. 2D is similar as that descried with reference to FIG. 2C.

In the above-described various structures, since the reflective LCD does not use a backlight assembly, the entire volume of the LCD is reduced by the volume that would be required for the backlight assembly. Also, since the transmissive LCD uses a built-in light-emitting source, the LCD has an advantage that it can be used in a dark place where an external light source is not available. Therefore, it is preferred that both the reflection type and the transmission type be used in order to achieve advantages of the two types. Consequently, it is a matter of choice to determine which part of the first display part I and the second display part II should be realized as a reflection type and which part should be realized as a transmission type.

Though the first display part and the second display part may be formed having the same size, either the first display part or the second display part may be formed larger than the other. For example, the first display part may be used as a main screen, and the second display part may be used as a sub-screen depending on importance of information displayed. In this case, it is preferred that the first display part for displaying important information thereon always displays an image regardless of the ambient illumination. On the other hand, the second display part for displaying relatively less important information does not need to always display an image. That is, it is possible to omit the backlight assembly and thus reduce the thickness of an LCD by allowing the second display part to be a reflection type and to always display information by allowing the first display part to have a transmission type.

A detailed structure of an LCD having a first display part serving as a main screen that operates using a built-in light-emitting source, and a second display part serving as a sub-screen that uses natural light will now be described.

Figure 3A:
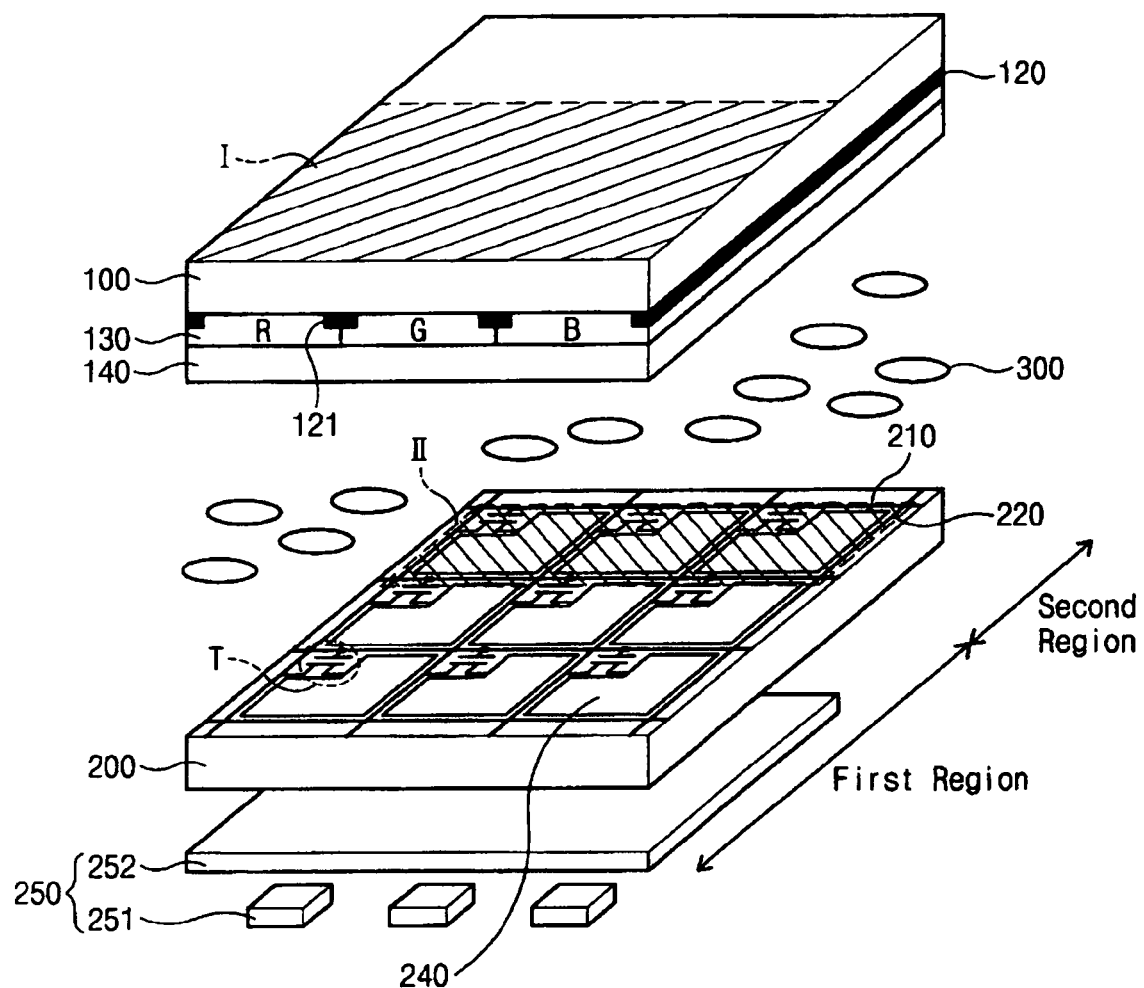
FIG. 3A is a perspective view of an LCD according to an embodiment of the present invention.

Referring to FIG. 3A, the LCD includes first substrate 100 and second substrate 200 coupled to face each other, and LC 300 interposed between the first and second substrates 100 and 200.

Each of the first and second substrates 100 and 200 is divided into a first region and a second region. A first display part I is formed on a first region located on an outer surface of the first substrate 100, and a second display part II, is formed on an outer surface of the second substrate 200. (Note, the hatched part in FIG. 3A is actually formed on an outer surface of the second substrate 200). The first display part I is used as a main screen, and the second display part II is used as a sub-screen. The first display part I is formed larger than that of the second display part II. A backlight assembly 250 is provided on the outer surface of the second substrate 200. The backlight assembly 250 includes a light source 251 and a light guide plate 252 and illuminates light onto the first display part I. A reflection layer pattern (not shown) is provided on the second region formed in an inner surface of the first substrate 100 to reflect light incident onto the second substrate 200 and the reflected light passes through the LC 300 and is illuminated onto the second display part II.

Gate lines 210 and data lines 220 are formed on an inner surface of the second substrate 200 to cross each other. Generally, the gate lines 210 and the data lines 220 are formed in matrix types in a row direction and a column direction, respectively. Each of the regions, which corresponds to a pixel region, is defined by the mutually intersecting gate lines 210 and data lines 220. Each pixel region includes a thin film transistor T (TFT) and a pixel electrode 240 connected to the TFT T. The TFT T includes a gate electrode branched from each gate line 210, a source electrode branched from each data line 220, and a drain electrode spaced apart from the source electrode. The pixel electrode 240 is connected to the TFT T via the drain electrode.

A light shielding layer pattern 120 having openings 121 each corresponding to each of the pixel regions is formed on an inner surface of the first substrate 100. Each of the openings 121 is filled with a color filter 130 expressing a color using red (R), green (G), and blue (B) colors. A common electrode 140 is formed on the color filter 130 to face the pixel electrodes 240.

While the LCD operates, a gate-on signal is applied to each of the gate lines 210 and the TFT T is turned on. A data signal according to image information is delivered to each of the data lines 220 and applied to the pixel electrode 240. Simultaneously, a common voltage is applied to the common electrode 140 of the first substrate 100, and an electric field generated by a voltage difference between the pixel electrode 240 and the common electrode 140 acts on the LC 300 to change an arrangement of the LC 300. Consequently, an image according to the arrangement of the LC 300 is displayed on one of the first display part I and the second display part II.

What is important in the above-described structure and operation is that the second display part II is formed on the outer surface of the second substrate 200. In the conventional LCD, an image has been displayed only on an outer surface of a substrate without the pixel regions. However, according to the present invention, not only the first substrate 100 but also the second substrate 200 with the pixel regions is used to display an image so that a plurality of display parts I and II are formed without increasing the number of substrates.

A more detailed vertical structure of the present invention will now be described.

FIG. 3B is a cross-sectional view of an LCD according to an embodiment of the present invention, taken along a data line direction.

Referring to FIG. 3B, the first substrate 100 has a different structure in its first region and its second region depending on whether a reflection layer pattern 110 exists or not. The second substrate 200 has a same structure in its first region and its second region.

The second substrate 200 will be described first. A gate line 210 is formed at a portion of the second substrate 200 that becomes a boundary of each pixel region. A gate insulation layer 215 and a protective layer 230 are formed on the gate line 210. The insulation layer 215 insulates the gate line 210 from a data line 220 formed in a predetermined region on the gate insulation layer 215. The passivation layer 230 is intended for protecting and insulating the data line 220. Each of the gate insulation layer 215 and the passivation layer 230 may be a silicon nitride layer. A pixel electrode 240 is separately formed for each of pixel regions on both sides of the gate line 210. The pixel electrode 240 is formed by depositing a transparent conductive layer using one of Indium Tin Oxide and Indium Zinc Oxide, and pattering the deposited transparent conductive layer.

A light shielding layer pattern 120 is formed on boundaries between the pixel regions of the first substrate 100. The light shielding layer pattern 120 may be formed of one of a metal thin film such as Cr and an organic film having a carbon material, and blocks light that passes through the LC 300 not controlled by the pixel electrode 240. The light shielding layer pattern 120 includes openings 121 each corresponding to each of the pixel region. The openings 121 are filled with a color filter 130, which filters light having a wavelength representing a predetermined color. The color filter 130 consists of a red filter, a green filer, and a blue filter, which are three primary colors, arranged alternately and regularly. Since the color filer 130 is intended for displaying color image, it can be omitted in a display device not displaying a color image. Also, even when a display device displays a color image, the color filter 130 is not necessarily formed on the first substrate 100 but may be formed on the second substrate 200. For example, the color filter 130 may be formed between the passivation layer 230 located between the second substrate 200 and the pixel electrodes 240. A common electrode 140, which corresponds to the pixel electrodes 240, is formed on the color filter 130. Like the pixel electrode 240, the common electrode 140 is formed by depositing a transparent conductive layer using one of Indium Tin Oxide and Indium Zinc Oxide. Though not shown in FIG. 3B, an overcoat layer may be interposed between the common electrode 140 and the color filter 130. The overcoat layer may be formed through spin coating that uses an acryl resin. The overcoat layer protects the color filer 130 and planarizes a surface of the first substrate 100.

A reflection layer pattern 110 is formed of Al or Ag having excellent reflectance on a predetermined region of the first substrate 100. The reflection layer pattern 110 reflects natural light to allow an image to be displayed. The reflection layer pattern 110 is formed only on the second region for a second display part II that operates in a reflection mode. The reflection layer pattern 110 is formed on the first substrate 100, and an organic insulation layer 105 may be interposed between the first substrate 100 and the reflection layer pattern 110. The organic insulation layer pattern 105 has a surface on which a plurality of irregularities are formed, and the reflection layer pattern 110 is indented along a shape of the irregularities. Such a shape has an advantage of generating diffused reflection of light and thus increasing reflectance.

The reflection layer pattern 110 is located at a position that corresponds to each of pixel regions and between the first substrate 100 and the color filter 130. Since the reflection layer pattern 110 is formed of conductive metal, it can be also used as an electrode to which a voltage is applied. If the reflection layer pattern 110 is formed on the color filter 130, it is possible to allow the reflection layer pattern 110 to serve as a separate common electrode 140 by applying a voltage to the reflection layer pattern 110 and thus having the reflection layer pattern 110 interact with the pixel electrode 240. However, when the reflection layer pattern 110 is formed on the color filter 130, light incident from the outside of the second substrate 200 is all reflected by the reflection layer pattern 110 and does not pass through the color filter 130, so that a clear color image cannot displayed on the second display part II. Since only simple information is displayed on the second display part II, the reflection layer pattern 110 may be formed on the color filter 130 if necessary with consideration of the number of processes or manufacturing costs. Particularly, when the color filter 130 is not used for the first substrate 100 as in the case where the color filter 130 is formed on the second substrate 200 or the second display part II is displayed in black and white, the reflection layer pattern 110 instead of the common electrode 140 may be used for the second region.

Outer surfaces of the first and second substrates 100 and 200 will be described. A backlight assembly 250 is mounted on the outer surface of the second substrate 200. The backlight assembly 250 is located on the first region of the second substrate 200 for the first display part I that operates in a transmissive mode. The backlight assembly 250 includes a light source 251 and a light guide plate 252. The light source 251 includes a light-emitting diode (LED) to generate light, and the light guide plate 252 is connected to one side of the light source 252 to guide light and illuminate the light onto the second substrate 200. Though not shown in FIG. 3B, optical sheets may be additionally provided between the second substrate 200 and the light guide plate 252 to enhance efficiency of light emitted from the light guide plate 252.

According to the above-described structure and operation, since a separate backlight assembly 250 is not required with regard to the second display part II, the size of the LCD may be maintained small. Also, the backlight assembly 250 does not operate and only natural light is used when the LCD operates in a reflection mode, so that power consumption reduces. An image containing important information is always displayed on the first display part I that operates in a transmissive mode.

Figure 4A:
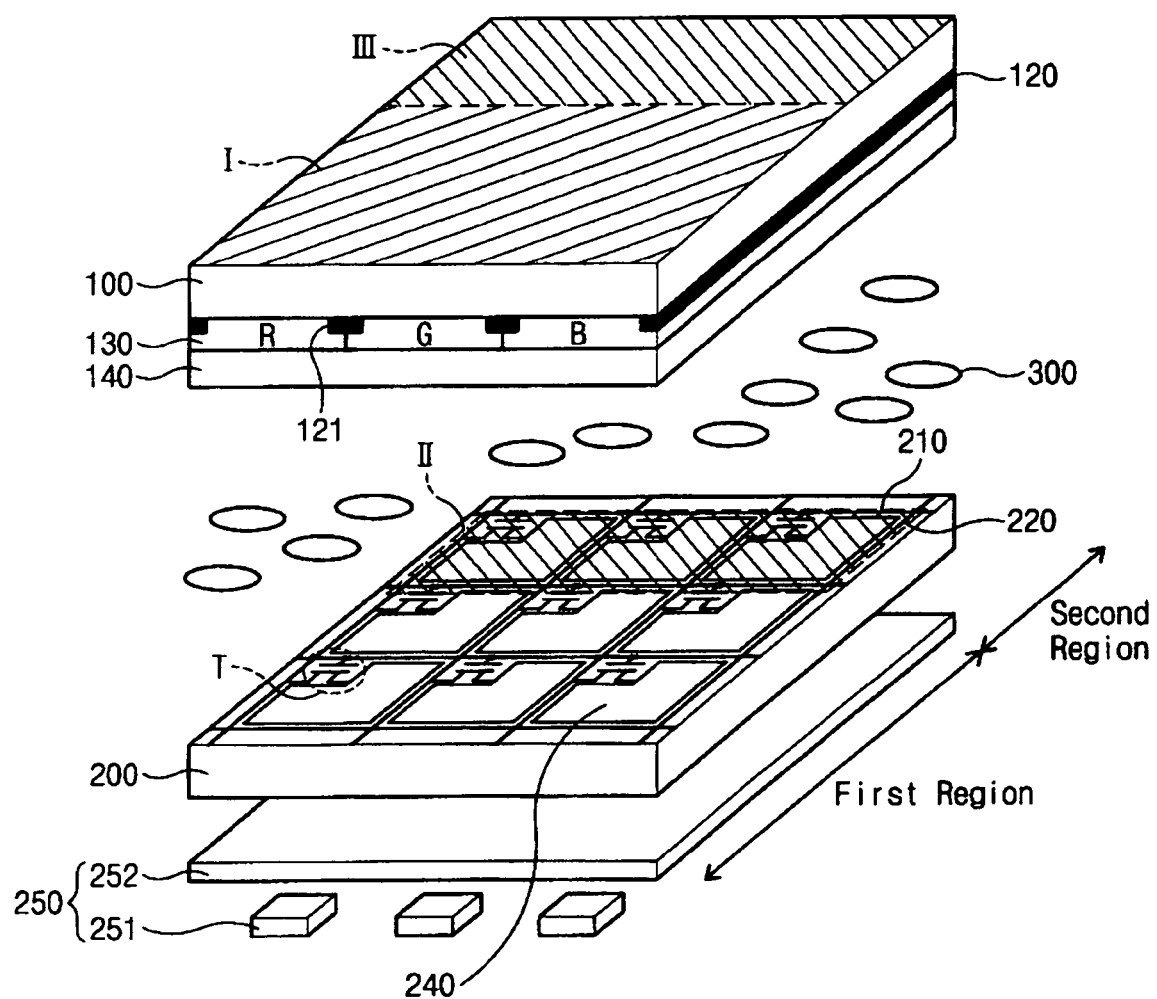
FIG. 4A is a perspective view of an LCD according to another embodiment of the present invention.

FIG. 4A is a perspective view of an LCD according to another embodiment of the present invention, and FIGS. 4B and 4C are cross-sectional views of the LCD of FIG. 4A, taken along a data line.

The LCD is realized to have two-sided display parts using two substrates. One display part operates in a transmissive mode, and the other display part operates in a transflective mode. The LCD according to the present embodiment is partially different in its operation from the LCD according to the previous embodiment. That is, when a changed part is excluded, a whole structure of the LCD is similar to that of the LCD according to the previous embodiment in an aspect of operation. Accordingly, detailed descriptions for parts common to the previous embodiment will be omitted.

Referring to FIG. 4A, the LCD includes first substrate 100 and second substrate 200 coupled to face each other, and LC 300 interposed between the first and second substrates 100 and 200. Each of the first and second substrates 100 and 200 is divided into a first region and a second region. A first display part I used as a transmissive main screen is formed on a first region located on an outer surface of the first substrate 100, and a second display part II (the hatched part in FIG. 4A is formed on an outer surface of the second substrate 200 actually) used for a sub-screen is formed on the second region located on an outer surface of the second substrate 200. Also, a third display part III is formed on the second region located on the outer surface of the first substrate 100. The same image is displayed on each of the second and third display parts II and III, but the image is displayed using a reflective operation on the second display part II while the image displayed using a transmissive operation on the third display part III.

According to the present invention, since the second display part II is formed on the outer surface of the second substrate 200, it is possible to display an image on both sides of the substrates using the plurality of display parts I, II and III without increasing the number of the substrates and without increasing a thickness of the LCD.

For the transmissive operation, a backlight assembly 250 is provided on an outer surface of the second substrate 200. The backlight assembly 250 includes a light source 251 and a light guide plate 252. Light from the light source 251 is emitted onto the first display part I and the third display part III. For the reflective operation, a reflection layer pattern (not shown) is provided to the second region located on an inner surface of the first substrate 100 to reflect light incident on the second substrate 200 and the reflected light passes through the LC 300 to display an image on the second display part II.

Gate lines 210 and data lines 220 are formed on an inner surface of the second substrate 200 to cross each other, defining pixel regions. A light shielding layer pattern 120 having openings that correspond to each of the pixel regions is formed on an inner surface of the first substrate 100. The openings are filled with a color filter 130 for displaying a color image.

FIGS. 4B and 4C are cross-sectional views of an LCD according to another embodiment of the present invention, taken along a data line of FIG. 4A.

Referring to FIG. 4B, the first substrate 100 has a different structure in its first region and its second region depending on whether a reflection layer pattern exists or not. The second substrate 200 has a same structure in its first region and its second region. A gate line 210 is formed at a portion of the second substrate 200 that becomes a boundary of each of pixel regions. A gate insulation layer 215 and a passivation layer 230 are formed on the gate line 210. A pixel electrode 240 is separately formed for each of the pixel regions on both sides of the gate line 210.

The light shielding layer pattern 120 is formed on boundaries between the pixel regions on the first substrate 100. The light shielding layer pattern 120 includes openings 121 each corresponding to each of the pixel regions. The openings 121 are filled with a color filter 130, which may be omitted in a display device having a black and white screen. Also, even when a display device has a color screen, the color screen is not necessarily formed on the first substrate 100 but may be formed on the second substrate 200.

A reflection layer pattern 110 is formed on a predetermined region of the first substrate 100. The reflection layer pattern 110 reflects natural light to allow an image to be displayed. The reflection layer pattern 110 is formed only on the second region for a second display part II that operates in a reflection mode. The reflection layer pattern 110 is formed on the first substrate 100, and an organic insulation layer 105 may be interposed between the first substrate 100 and the reflection layer pattern 110. The organic insulation layer pattern 105 has a surface on which a plurality of irregularities are formed, and the reflection layer pattern 110 is indented along a shape of the irregularities. Such a shape generates diffused reflection of light and thus increasing reflectance.

The reflection layer pattern 110 is not formed over an entire region that is located in the light shielding layer pattern 120 and corresponds to each of the pixel regions, but formed over only portion of the entire region. Therefore, when a single pixel region operates in a reflection mode, a region containing the reflection layer pattern 110 is used. Also, when the single pixel operates in a transmissive mode, a region not containing the reflection layer pattern 110 is used.

Outer surfaces of the first and second substrates 100 and 200 will be described. The backlight assembly 250 is mounted on the outer surface of the second substrate 200. The backlight assembly 250 includes the light source 251 and the light guide plate 252. The light guide plate 252 is formed over the first and second regions and operates such that an image is displayed on the first display part I and the third display part III during a transmissive mode.

The light guide plate 252 may be uniformly or differently patterned over the first and second regions. Light is emitted in one direction only or both directions depending on the patterning of the light guide plate 252. The light guide plate 252 may be patterned over the second region such that light is emitted in an upper direction only. When light from the light source 251 is emitted in a lower direction in the second region, the emitted light does not pass through the LC 300 and thus it is difficult to identify an image displayed on the second display part II using the light emitted from the light guide plate 252. On the other hand, a separate display part is not formed on the first region of the second substrate 200. Also, in the first region, the light guide plate 252 is patterned such that light is emitted in an upper direction or both directions. For the former case, the light guide plate 252 is uniformly patterned over the first and second regions. For the latter case, the light guide plate 252 is differently patterned on the first region and the second region. Since it is difficult to perform patterning such that light is emitted in one direction, the latter case is preferred in an aspect of a process. Optical sheets may be interposed between the second substrate 200 and the light guide plate 252.

Referring to FIG. 4C, in a modification of the present embodiment, the reflection layer pattern 110 may be formed on the color filter 130 with a common electrode 140. In this case, the reflection layer pattern 110 formed of metal is used together with the common electrode 140 as an electrode to which a voltage is applied. However, when the reflection layer pattern 110 is formed on the color filter 130, light incident from the outside of the second substrate 200 is all reflected by the reflection layer pattern 110 and thus cannot pass through the color filter 130, so that a clear image cannot be expressed on the second display part II. However, since the same image as that displayed on the second display part II can be displayed on the third display part III, the reflection layer pattern 110 may be formed on the color filter 130 if necessary with consideration of the number of processes or manufacturing costs.

Each information displayed on the first display part I and the second display part II (or the third display part III) has different importance. That is, essential information is displayed on the first display part I used as a main screen, while additional information is displayed on the third display part III used as a sub-screen. The addition information includes weather, a day of the week, or time, which does not deed to be displayed with high resolution and various colors. Such information may be displayed using only a basic color. The first and second display parts I and II may have different pixel configurations with consideration of this.

Figure 5:
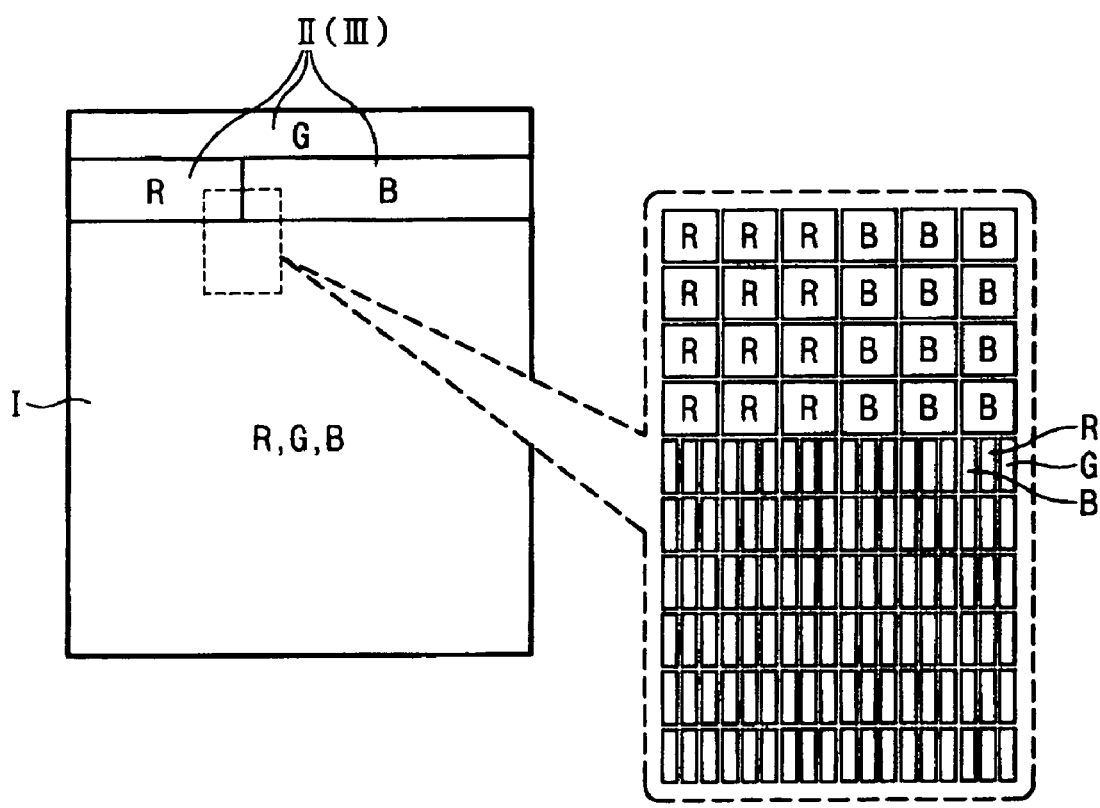
FIG. 5 is a view illustrating a screen configuration of an LCD according to an embodiment of the present invention.

FIG. 5 is a view illustrating a screen configuration of an LCD according to an embodiment of the present invention.

Referring to FIG. 5, the first display part I includes a single main pixel consisting of three sub-pixels representing red, green, and blue colors, respectively. The single main pixel expresses various colors using gradations of respective sub-pixels. On the other hand, the second display part II (or the third display part III) consists of main pixels representing a single color without sub-pixels. Therefore, the size of a fundamental pixel in the second display part II is three times greater than that in the first display part I. The second display part II is divided into a region R represented using only a red color, a region G represented using only a green color, and a region B represented using only a blue color. Also, unlike FIG. 5, the second display part II may be a single region represented using one of red, green, and blue colors. Also, the second display part II may be divided into only two regions represented using two colors of three primary colors.

A main pixel of the second display part II is formed without sub-pixels. Accordingly, the second display part II cannot express various colors but has a high aperture ratio, representing high brightness.

It is possible to manufacture a miniature apparatus having a two-sided screen by making use of the LCD according to the present invention. Specifically, the present invention may be applied to terminals used for mobile communication.

Figure 6A:
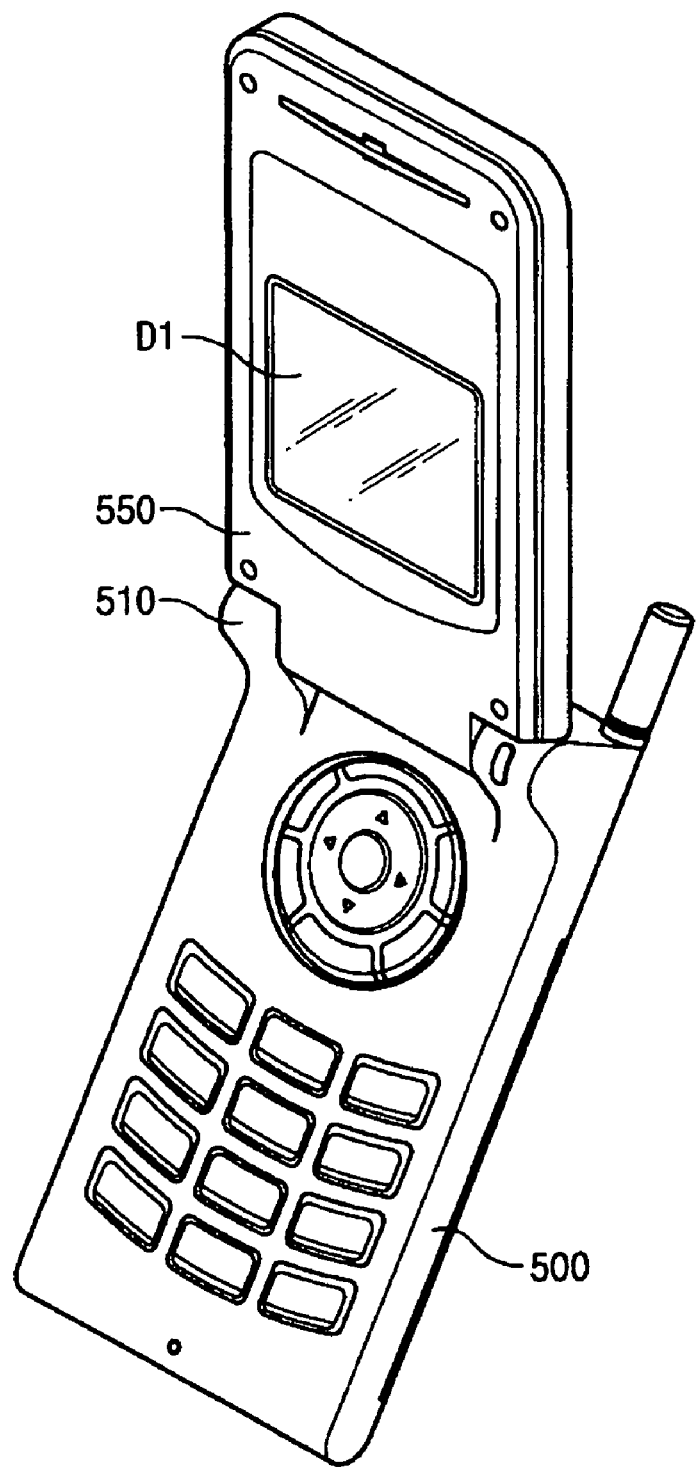
FIGS. 6A and 6B are perspective views illustrating a terminal according to an embodiment of the present invention is opened and closed, respectively.
Figure 6B:
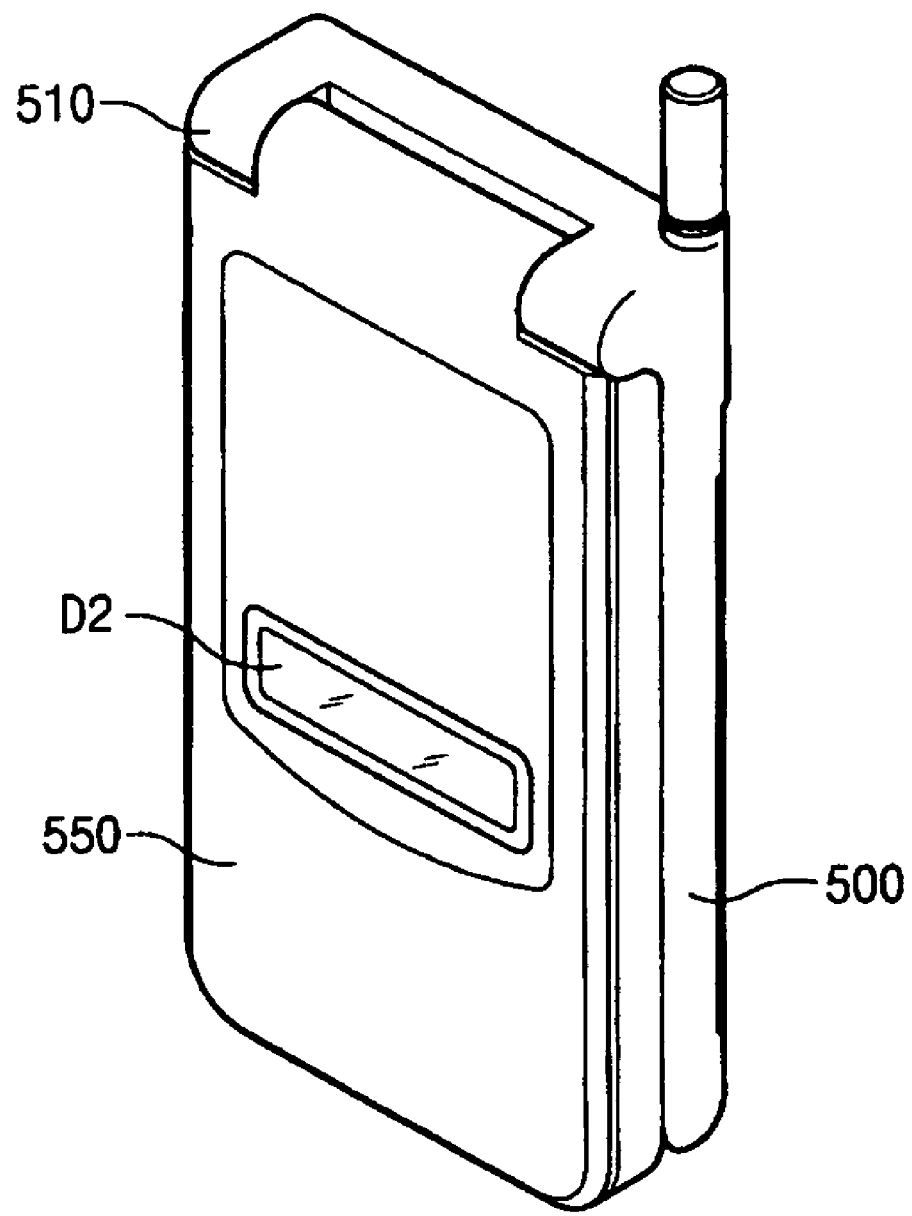
Figure 7A:
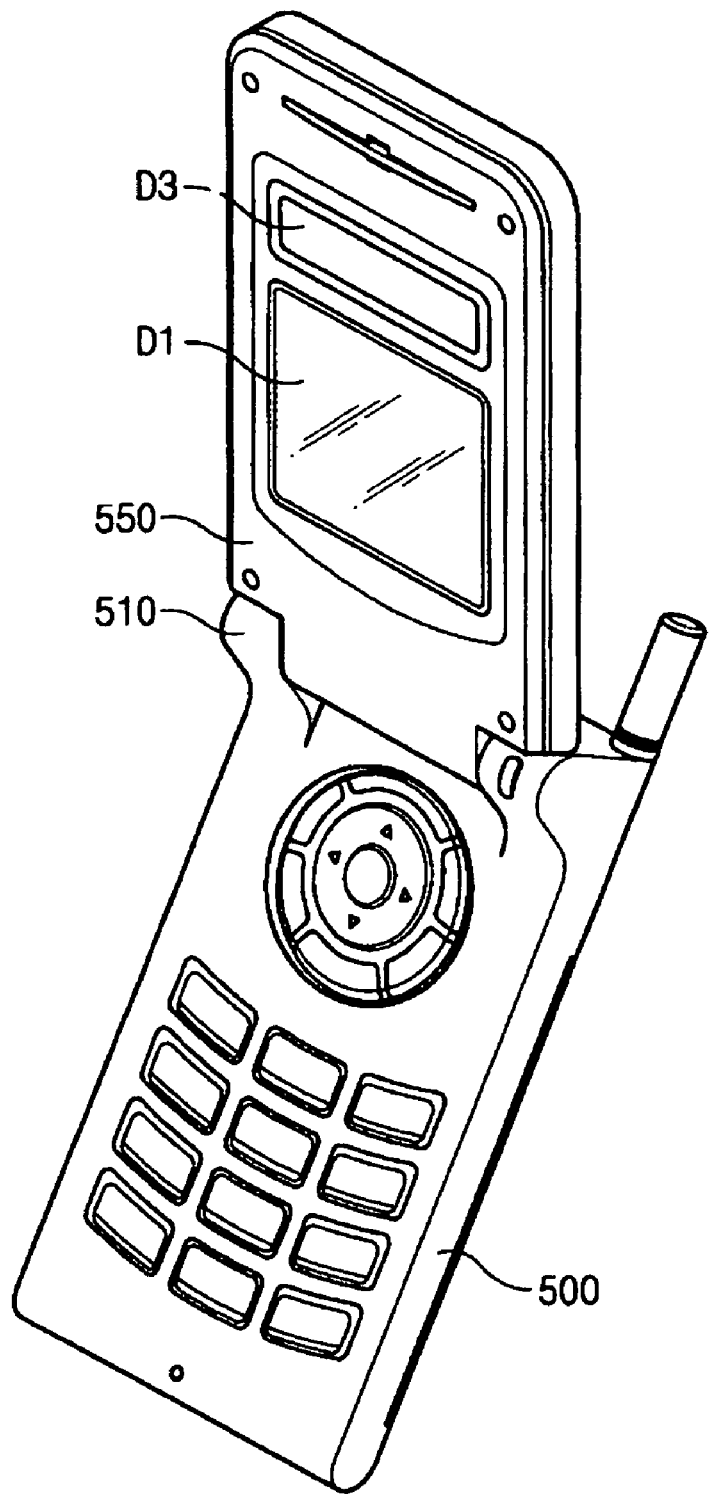
FIGS. 7A and 7B are perspective views illustrating a terminal according to another embodiment of the present invention is opened and closed, respectively.
Figure 7B:
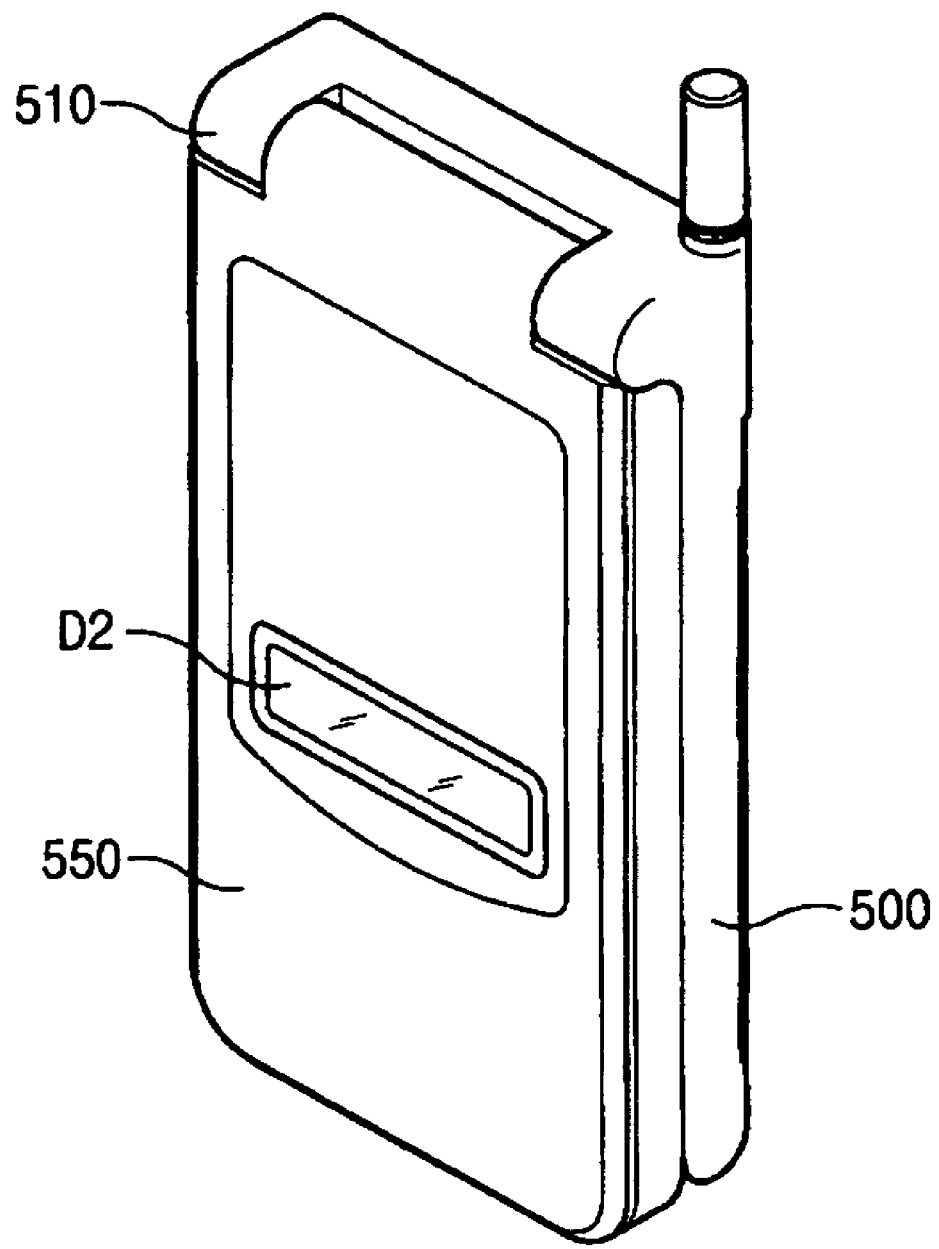

Referring to FIGS. 6A and 6B, the terminal includes a main body 500 having a communication module therein. Folder 550 is opened/closed by rotating through a hinge part 510. As illustrated in FIG. 6A, a keypad formed on the main body 500, for inputting characters is shown when the folder 550 is opened. Also, a display window D1 for displaying characters or other figures according to input information is formed on the folder 550. On the other hand, as illustrated in FIG. 6B, even when the folder 550 is closed, an image is displayed through another display window D2 to deliver simple information such as a current time. Since essential information such as a phone number and a short message, which are essential to the terminal, is displayed on the display window D1 when the folder 550 is opened, the display window D1 may be formed large. Also, since simple everyday life information, which is not related to an essential function of the terminal, is displayed on the display window D2 when the folder 550 is closed, the display window D2 may be formed small. Therefore, it is possible to provide the first display part I for the display window D1 serving as a main screen when the folder 550 is opened and provide the second display part II for the display window D2 serving as a sub-screen when the folder 550 is closed by installing the LCD according to the embodiment described with reference to FIG. 3A in the folder 550. In this case, two substrates and only a single backlight assembly are used inside the folder 550, thereby reducing the thickness of the folder 550 as well as the overall size of the terminal. Referring to FIGS. 7A and 7B, the terminal includes a main body 500, a hinge part 510, and a folder 550. A display window D1 formed on the folder 550, for displaying characters or other figures according to input information is shown when the folder 550 is opened. Also, simple information such as a current time is displayed on another display window D3 formed small and adjacent to the display window D1. The simple information displayed on the third display window D3 is also displayed on still another display window D2 displayed when the folder 550 is closed.

The LCD according to the embodiment described with reference to FIG. 4A may be applied to the terminal including these display windows D1, D2, and D3. It is possible to provide the first display part I and the third display part III for the display windows D1 and D3 when the folder 550 is opened and provide the second display part II for the display window D2 when the folder 550 is closed by installing the LCD according to the embodiment described with reference to FIG. 4A in the folder 550.

As described above, according to an LCD and a terminal using the same, it is possible to provide a plurality of display parts each being divided for each region using only two substrates. Therefore, a consumer's demand that a small size is preferred is satisfied, which enhances product competitiveness. Also, since the number of substrates reduces, manufacturing costs and the number of processes reduce.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A display apparatus comprising:
a first substrate having a first region and a second region;
a reflection layer pattern formed in the second region of the first substrate;
a second substrate facing the first substrate having pixel regions defined therein;
a pixel electrode formed in each of the pixel regions on the second substrate, and
a color filter formed over the first region and the second region, and located on the reflection layer pattern;
wherein the reflection layer pattern being located in a predetermined region corresponding to each of the pixel regions,
wherein only one kind of color is displayed on the second region, or the second region is divided into a plurality of regions on each of which only one kind of color is displayed, and
wherein each of the pixel regions in the second region is larger than that of the first region.

2. The display apparatus of claim 1, further comprising a backlight assembly mounted on a portion of the second substrate that is opposite to the pixel electrode and illuminating light onto the first region.

3. The display apparatus of claim 2, wherein the backlight assembly comprises a light source and a light guide plate that is located on one side of the light source and formed over the first region.

4. The display apparatus of claim 1, wherein the reflection layer pattern is formed to be limited to an area of the second substrate that corresponds to portion of each of the pixel regions.

5. The display apparatus of claim 4, further comprising a backlight assembly mounted on a portion of the second substrate that is opposite to the pixel electrode for illuminating the first region and the second region.

6. The display apparatus of claim 5, wherein the backlight assembly comprises a light source and a light guide plate that is formed on one side of the light source, and the light guide plate is formed in a first pattern over the first region and in a second pattern over the second region.

7. The display apparatus of claim 1, wherein each of the pixel regions in the second region is three times larger than that of the first region.

8. The display apparatus of claim 1, further comprising a light shielding layer pattern formed on the first substrate to have openings that correspond to each of the pixel regions.

9. The display apparatus of claim 8, wherein the reflection layer pattern is formed on an entire or partial region where each of the openings is formed.

10. The display apparatus of claim 1, further comprising an organic insulation layer pattern interposed between the first substrate and the reflection layer pattern.

11. The display apparatus of claim 10, wherein the organic insulation layer pattern has a surface on which a plurality of irregularities are formed, and the reflection layer pattern is indented along a shape of the irregularities.

12. A display apparatus comprising:
a main body and a folder that is connected thereto, the folder being opened and closed;
a first substrate installed in the folder and divided into a first region and a second region;
a reflection layer pattern formed in the second region on the first substrate;
a second substrate installed in the folder to face the first substrate and where pixel regions are defined;
a pixel electrode is formed in each of the pixel regions on the second substrate, and
a color filter formed over the first region and the second region, and located on the reflection layer pattern;
wherein the reflection pattern is located in a predetermined region corresponding to each of the pixel regions, and
wherein an image is displayed in the first region of the first substrate when the folder is opened and displays in the second region of the second substrate when the folder is closed,
wherein only one kind of color is displayed on the second region, or the second region is divided into a plurality of regions on each of which only one kind of color is displayed, and
wherein each of the pixel regions in the second region is larger than that of the first region.

13. The display apparatus of claim 12, further comprising a backlight assembly mounted on a portion of the second substrate that is opposite to the pixel electrode and illuminating light onto the first region.

14. The display apparatus of claim 13, wherein the backlight assembly comprises a light source and a light guide plate that is located on one side of the light source and formed over the first region.

15. The display apparatus of claim 12, wherein the reflection layer pattern is formed to be limited to an area of the second substrate that corresponds to portion of each of the pixel regions and an image is displayed in the second region of the first substrate when the folder is opened.

16. The display apparatus of claim 15, further comprising a backlight assembly mounted on a portion of the second substrate that is opposite to the pixel electrode and illuminating light onto the first region and the second region.

17. The display apparatus of claim 16, wherein the backlight assembly comprises a light source and a light guide plate formed on one side of the light source, and the light guide plate is formed in a first pattern over the first region and in a second pattern over the second region.

18. The display apparatus of claim 12, further comprising a light shielding layer pattern formed on the first substrate to have openings that correspond to each of the pixel regions.

19. The display apparatus of claim 18, wherein the reflection layer pattern is formed on an entire or partial region where each of the openings is formed.

20. A liquid crystal display apparatus comprising:
a first and a second substrate having facing surfaces and exterior surfaces, the first substrate having a first and a second region;
a liquid crystal interposed between said facing surfaces,
a backlight assembly for mounting to an exterior surface of either of said substrates;
a reflective layer provided on an interior surface of one of said surfaces remote from said backlight assembly; and
a color filter formed over the first region and the second region, and located on the reflection layer pattern;
wherein only one kind of color is displayed on the second region, or the second region is divided into a plurality of regions on each of which only one kind of color is displayed, and
wherein each of the pixel regions in the second region is larger than that of the first region.

* * * * *